(12) United States Patent
Day et al.

(10) Patent No.: US 6,184,485 B1
(45) Date of Patent: Feb. 6, 2001

(54) METHOD OF MEASURING FLEXURE VALUE OF WIRE ELECTRODE

(75) Inventors: Yea-June Day, Hsinchu; Jui-Fang Liang, Chang Hwa; Cheng-Fu Tsai, Hsinchu; Hsi-Pin Li, Hsinchu; Mu-Tian Yan, Hsinchu, all of (TW)

(73) Assignee: Industrial Technology Research Institute, Hsinchu Hsien (TW)

( * ) Notice: Under 35 U.S.C. 154(b), the term of this patent shall be extended for 0 days.

(21) Appl. No.: 09/270,652

(22) Filed: Mar. 16, 1999

(51) Int. Cl.$^7$ ...................................................... B23H 7/06
(52) U.S. Cl. ............................................................ 219/69.12
(58) Field of Search .............................. 219/69.12, 69.17; 700/162

(56) References Cited

U.S. PATENT DOCUMENTS

| | | | |
|---|---|---|---|
| 4,324,970 | * 4/1982 | Nanasawa et al. | 219/69.12 |
| 4,499,359 | * 2/1985 | Obara | 219/69.12 |
| 4,520,253 | * 5/1985 | Gamo et al. | 219/69.12 |
| 4,521,662 | * 6/1985 | Kinoshita et al. | 219/69.12 |
| 4,523,073 | * 6/1985 | Gamo et al. | 219/69.12 |
| 4,546,227 | * 10/1985 | Gamo et al. | 219/69.12 |
| 4,673,787 | * 6/1987 | Inoue | 219/69.12 |
| 4,773,030 | * 9/1988 | Delpretti | 219/69.12 |
| 4,970,362 | * 11/1990 | Ono | 219/69.12 |

* cited by examiner

Primary Examiner—Geoffrey S. Evans
(74) Attorney, Agent, or Firm—Smith, Gambrell & Russell, LLP

(57) ABSTRACT

A method for solving the problem that the machining accuracy in a corner part or in a circular arc is reduced by the line flexure during the wire-cut electric discharge machining. In the method, the controller of the wire-cut electric discharge machine with a built-in function of measuring error of wire flexure, after the machining, a detection voltage of the machine detects the machined groove. If the wire electrode comes into contact with the workpiece, the short-circuit caused by the wire flexure in the corner part or in a circular arc is detected, and then the compensation value of the wire flexure is gradually changed to continue the groove detection until the wire electrode and the workpiece are not short-circuited and the groove detection stops. Then the wire flexure value in the corner part or in the circular arc is obtained to establish the machining parameter data of the machine to automatically compensate the wire flexure value in the following machining.

13 Claims, 4 Drawing Sheets

METHOD OF MEASURING FLEXURE VALUE OF WIRE ELECTRODE

FIELD OF THE INVENTION

The present invention relates to a method of measuring flexure value of a wire electrode, and more particularly, to a method of measuring flexure value of a wire electrode to solve the problem that a reduced machining accuracy is caused by a wire flexure during a wire-cut electric discharge machine cutting in a corner part or in a circular arc.

DESCRIPTION OF THE PRIOR ART

In a operation of wire-cut electric discharge machining, a wire flexure in a corner part or a circular arc would reduce a machining accuracy. As shown in FIG. 1, symbol 1 denotes a wire electrode (diameter $\phi$), numeral 2 denotes a workpiece, numeral 3 denotes a groove, phantom line 4 denotes a curve path caused by the wire flexure and formed in the corner part which is cut at a junction with two straight lines intersecting with each other during the wire-cut electric discharge machine operation, and gd which is a distance between the wire electrode and the workpiece is the discharge gap. The normal way for improving the wire flexure is to use a three-dimensional measuring machine, a tracer, or a projector to measure a cutting error value and to store the cutting error value into a controller as a machining parameter. But not all users have good measuring instruments, and then, would have problems in measuring products with complicated shape. Besides expensive instruments problem or the cutting error value problem, it is a complicated way to store measuring values into the controller as machining parameters for a next machining after the error value has been measured.

SUMMARY OF THIS INVENTION

It is therefore a primary objective of the present invention to provide a method of quickly measuring the error value after the wire-cut electric discharge machining to establish machining parameters data of the wire-cut electric discharge machine for automatically compensating the flexure of the wire-cut electric discharge machine through the controller in the next machining.

Another object of the present invention is to provide a method of measuring the wire flexure of the machined workpiece through functions of the controller to reduce cost of investment for measuring the flexure of the wire-cut electric discharge machine.

In the present invention, the measurement of the flexure of the wire-cut electric discharge machine comprises the following steps of (a) making the wire electrode 1 which is in the machining path come into contact with a dection edge of the workpiece 2 in a straight machining groove, after the course of machining (without wasted materials), to get the electric discharge gap gd which is the distance between a margin of wire electrode without contacting with the workpiece 2 along the straight machining path and a point where the wire electrode contacts with the workpiece;

(b) using the detection voltage of the machine to detect the machined groove, and an original programmed path minus the discharge gap gd as a new programmed path to trigger the detection voltage for dry-run and re-machining the workpiece;

(c) measuring and recording the position in the corner part where the wire electrode and the workpiece are short-circuited for an angle in the corner part less than 180°;

(d) increasing a compensation value for the angle in the corner part less than 180°, and decreasing a compensation value for the angle in the corner part greater than 180°, to advance the machine in the machined groove for detecting and recording that the short-circuited would happen in the corner part or not, in accordance with the re-machining process (dry-run);

(e) finding a present compensation value which is the compensation value of the flexure value in that corner part, for the angle in the corner part less than 180°, while the contact between the wire electrode and the workpiece is just released, and finding a last compensation value which is previous to a present compensation value and used as the compensation value for the corner part to find out the flexure value of that corner part, for the angle in the corner part greater than 180°, while the wire electrode and the workpiece are short-circuited; and (f) storing the compensation value of the flexure value and the flexure value in different corner part in a memory built in an numerical control device for adjusting the discharge parameters at machining.

The wire flexure value in the step (e) is obtained from the compensation value of the flexure value divided by the sine function of one half of an angle in the corner part. For the angle in the corner part less than 180°, the compensation direction is in the direction of deviating from the short-circuited curve path. But for the angle in the corner part greater than 180°, the compensation direction is in the direction of approaching the short-circuited curve path.

The compensation value of this method chosen by users for the re-machining can be increased or decreased.

In the present invention, the measurement for the flexure of the wire-cut electric discharge machine comprises the following steps of (a) making the wire electrode 1 which is in the machining path come into contact with the detection edge of the workpiece 2 in a straight machining groove, after the course of machining (without wasted materials), to get the electric discharge gap gd which is the distance between the margin of wire electrode without contacting with the workpiece 2 along the straight machining path and the point where the wire electrode contacts with the workpiece;

(b) using the detection voltage of the machine to detect the machined groove, and using the original programmed path minus the discharge gap gd as the new programmed path to trigger the detection voltage, for dry-run and re-machining the workpiece;

(c) measuring the line flexure value to find out the compensation value for the angle in different corners, for an angle in a corner part less than 180°, while the wire electrode advances in a groove along the machining path to the center line position of the angle, and then, the wire electrode would contact with the short-circuited curve path, and thereafter, the wire electrode is retracted relative to the short-circuited path along the center line of the angle, and when the short-circuited contact between the wire electrode and the workpiece has been just released by the foregoing retraction, the displacement is the wire flexure in that corner part, taking the wire flexure value times the sine function of one half of the angle in the corner part as the compensation value of the flexure in the corner part, and, for an angle in a corner part greater than 180°, while the wire electrode advances in the groove along the machining path to the center line position of the angle, and then, the wire electrode would keep a distance from the short-circuited curve path, and thereafter, the wire electrode is advanced relative to the short-circuited path along the center line of the angle, and when the wire electrode has come into contact with the short-circuited curve path, and the short-circuited contact between the wire electrode and the short-circuited curve path has been just released by the foregoing advance, the displacement is the wire flexure in that corner part, and taking the wire flexure value times the sine function of one half of the angle in the corner part as the compensation value of the flexure in the corner part; and (d) storing the flexure value and the compensation value of the flexure value in different angles in a memory built in a numerical control device for adjusting the discharge parameters in the course of machining in the next time.

The method for measuring the flexure value and the compensation value in the circular arc during the course of working comprises the following steps of:

(a) making the wire electrode 1 which is in the machining path come into contact with the detection edge of the workpiece 2, after the course of machining (without wasted materials), to get the electric discharge gap gd which is the distance between the margin of wire electrode without contacting with the workpiece 2 along the straight machining path and the point where the wire electrode contacts with the workpiece;

(b) using the detection voltage of the machine to detect the machined groove, and using the original programmed path minus the discharge gap gd as the new programmed path to trigger the detection voltage for dry-run and re-machining the workpiece;

(c) measuring and recording a position where the wire electrode and the workpiece are short-circuited in the circular arc, for the inside of a circular arc;

(d) increasing the compensation value for the inside of the circular arc, and decreasing the compensation value for the outside of the circular arc, to advance the machine in the machined groove for detecting and recording that the short-circuited would happen in the circular arc or not, in accordance with the re-machining process (dry-run);

(e) finding a present compensation value which is the compensation value of the flexure value in that circular arc, for the inside of the circular arc, while the contact between the wire electrode and the workpiece is just released, and finding the last compensation value which is previous to the present compensation value and used as the compensation value for the circular arc to find out the flexure value of that circular arc, for the outside of the circular arc, while the wire electrode and the workpiece are short-circuited; and (f) storing the compensation value of the flexure value and the flexure value in different corner part in a memory built in an numerical control device for adjusting the discharge parameters at machining.

As for the flexure value in aforesaid step (e), no matter in the inside or the outside of the circular arc, if the compensation value of the flexure value in the circular arc is not greater than that of planned dry-run path in that circular arc, the flexure value is equal to the compensation value of the flexure value. If the compensation value of the flexure value in the circular arc is greater than that of planned dry-run path in that circular arc, the flexure value is equal to the radius of curvature of the planned dry-run path in that circular arc plus a difference between the compensation value of the flexure value and the planned dry-run path in that circular arc divided by the cosine function of half of the central angle of the circular arc.

For the irregular circular arc in the machined groove, the proper compensation value and the wire flexure of the irregular circular arc are obtained from dividing the irregular arc into several arcs for approximating them into several circular arcs to find out the proper compensation value and flexure and to record them into the control device for adjusting the discharging parameters in the process of machining.

The measurement of the wire flexure and compensation value of the circular arcs in the machined groove for the process of machining comprises the following steps of:

(a) making the wire electrode 1 which is in the machining path come into contact with the detection edge of the workpiece 2 in a straight machining groove, after the course of machining (without wasted materials), to get the electric discharge gap gd which is the distance between the margin of wire electrode without contacting with the workpiece 2 along the straight machining path and the point where the wire electrode contacts with the workpiece;

(b) using the detection voltage of the machine to detect the machined groove, and using the original programmed path minus the discharge gap gd as the new programmed path to trigger the detection voltage, for dry-run and re-machining the workpiece;

(c) compensating the wire flexure value for a position in each circular arc, for positions inside the circular arcs, while the wire electrode advances in a groove along the machining path to reach the connecting line from the center of the curvature of the circular arc to the middle point of the corresponding circular arc, and then, contacts with the short-circuited curve path, and thereafter, the wire electrode is retracted relative to the short-circuited curve path along the connecting line, and when the short-circuited contact between the wire electrode and the workpiece has been just released by the foregoing retraction, the displacement is the line flexure in the circular arc, and if the line flexure in that circular arc is less than or equal to the radius of curvature of that circular arc in the planned dry-run path, taking the wire flexure which is equal to a compensation value of that wire flexure as the compensation value, and if the flexure is greater than the radius of curvature of that circular arc in the planned dry-run path, taking a compensation value of the flexure which is equal to the flexure times the cosine function of one half of central angle of that arc plus the difference between the radius of curvature of that circular arc in the planned dry-run path times 1 and the cosine function of half central angle of that arc as the compensation, and, for positions outside the circular arcs, while the wire electrode advances in a groove along the machining path to reach the connecting line from the center of the curvature of the circular arc to the middle point of the corresponding circular arc, and then, the wire electrode is advanced relative to the short-circuited curve path along the connecting line, and when the wire electrode has come into contact with the short-circuited curve path and the short-circuited contact between the wire electrode and the workpiece has been just released by the outgoing retraction, the displacement is the line flexure in the circular arc, and if the line flexure in that circular arc is less than or equal to the radius of curvature of that circular arc in the planned dry-run path, taking the wire flexure which is equal to the compensation value of that line flexure as the compensation value, and if the flexure is greater than the radius of curvature of that circular arc in the planned idle running path, taking a compensation value of the flexure which is equal to the flexure times the cosine function of one half of central angle of that arc plus the difference between the radius of curvature of that circular arc in the planned dry-run path times 1 and the cosine function of half central angle of that arc as the compensation value; and (d) recording the wire flexure in each circular arc as parameters in the controller to adjust the discharge parameters in the following process of machining.

This invention using the detection voltage of the wire-cut electric discharge machine detects the machined groove to find out the flexure by functions of the working machine, and finds out the average value of several angles with the same degrees in the machined groove or the average value of flexure of several different angles in different positions of the machined groove as the flexure.

BRIEF DESCRIPTION OF THE DRAWINGS

The present invention can be more fully understood by reading the subsequent detailed description of the preferred embodiments thereof with references made to the accompanying drawings, wherein.

DETAILED DESCRIPTION OF THE PREFERRED EMBODIMENT

Figure 1:
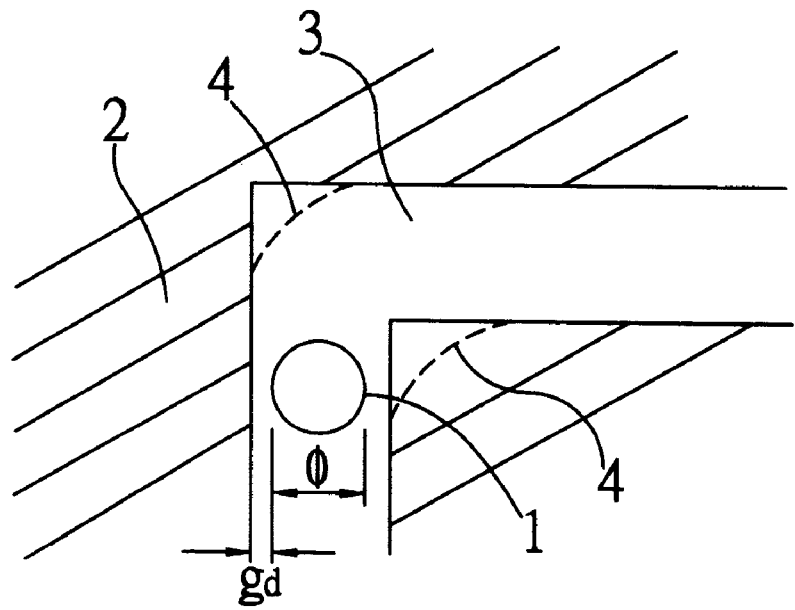
FIG. 1 is a schematic view which illustrates the wire flexure in the process of wire-cut electric discharge machining decreasing the machining accuracy at the corner part or the circular arc during electric discharge machining in a wire-cut electric discharge machine.

As shown in FIG. 1, during the machining of discharging, the machining gap is equal to the diameter φ of the wire electrode plus the discharging gap gd times two. Thus, in an embodiment of this invention shown in FIG. 2, after the unwanted wasted materials and scrap have been removed to get the space 5, the wire electrode detects margins of the workpiece 2 in a straight groove (from a2 to a3) of the machined path to get the discharging gap gd which is the distance between the margin of wire electrode without contacting with the workpiece along the straight machining path and the point where the wire electrode contacts with the workpiece. As shown by the phantom line 6 in the FIG., the new dry-run path is obtained by deducting the discharging gap gd from the original programmed path to trigger the detection voltage which is used for detecting the margin of the workpiece to make the wire electrode move along the new dry-run path without contacting with the workpiece. For angles less than 180°, such as angle a1, a2, a3, a4, b, c, d and I, positions where the wire electrode short-circuits with the short-circuited curve path in corner parts are recorded, and the compensation values are gradually changed by an amount, such as 5 μm, during machining processes. For angles less than 180°, the compensation value are increased, wherein the phantom line 6 approaches the interior of space 5 to deviate from a direction of short-circuited curve path, and for angles greater than 180°, the compensation values are decreased, wherein the phantom line 6 approaches the exterior of space 5 to advance on a direction of short-circuited curve path. After the compensation value has been changed, the wire electrode re-machines in the machined groove along the new dry-run path to record that whether the wire electrode short-circuits with the workpiece in each corner part or not. The table 1 illustrates the short-circuited testing records of dry-run in each corner part. For an angle in the corner part less than 180°, the compensation value in the position where the short-circuit between the wire electrode and the workpiece is just released is the compensation value of the wire flexure in this position in the corner part, and for an angle in the corner part greater than 180°, the compensation value previous to the present one in the position where the short-circuit between the wire electrode and the workpiece is just released is the compensation value of the wire flexure in the position in the corner part. The wire flexure of the angle in the corner part is obtained from the compensation values. The wire flexures and compensation values of the wire flexures in positions of different angles are recorded into the controller of the wire-cut electric discharge machine for adjusting the discharge parameters in the following processes.

Figure 3A:
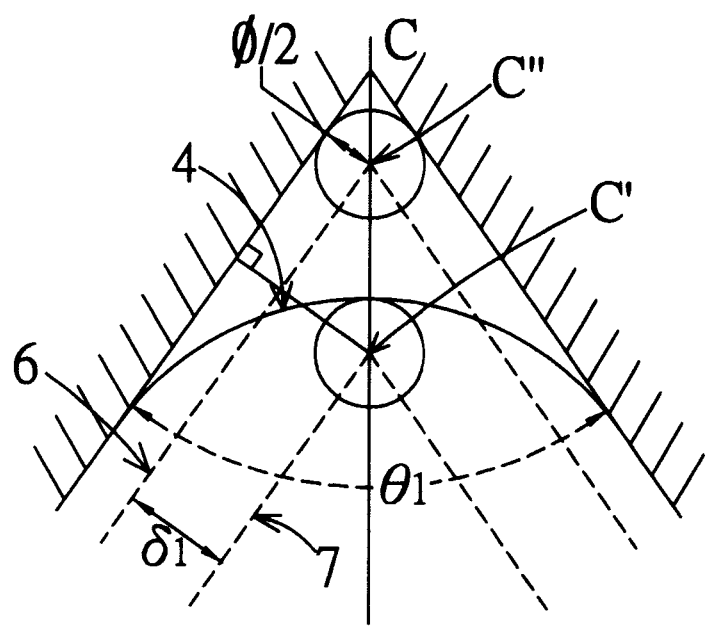
FIG. 3a is a schematic view which illustrates a method for measuring the compensation value of the wire flexure of wire-cut electric discharge machine for an angle less than 180° in accordance with the embodiment of FIG. 2.

For an angle in the corner part less than 180, for example, the angle c in the FIG. 3(a) which is denoted by θ1, the center of the wire electrode in a position of the corner part in the planned dry-run path is denoted by C", the non-short-circuited path in which the compensation value δ1 (obtained after several idle running processes) is added and the wire electrode is non-short-circuited with the workpiece in the position of the angle c is denoted by 7, the center of the wire electrode in the position of the angle in the corner part is denoted by C', and the contour of the machined curve path is denoted by 4. The centers C" and C' are located in the bisector of the angle C, and the radius of the wire electrode is Φ/2. Therefore, the distance CC' between the point C of the corner part and the point C', which is in the center of the wire electrode contacting with the short-circuited path 4 and located in the bisector of angle C, minus the distance between point C and C" is the wire flexure C'C" in the angle c, thus, $$\text{The wire flexure} = c'c'' = cc' - cc''$$
$$= (\delta 1 + \Phi/2)\sin(\theta/2) - (\Phi/2)/\sin(\theta/2)$$
$$= \delta 1/\sin(\theta/2).$$

Figure 3B:
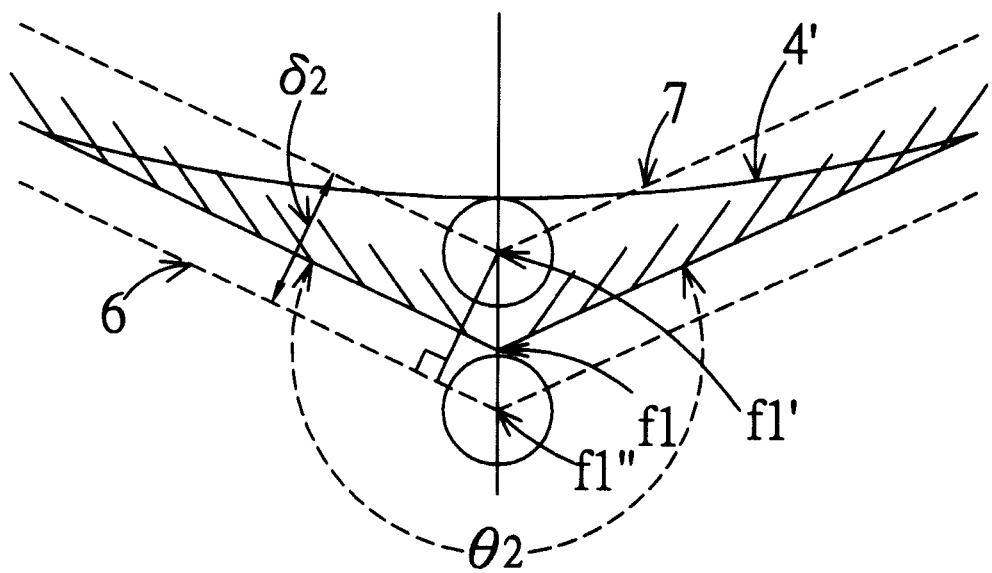
FIG. 3b is a schematic view which illustrates a method for measuring the compensation value of the wire flexure of wire-cut electric discharge machine for an angle greater than 180° in accordance with the embodiment of FIG. 2.

For angle in the corner part greater than 180°, for example, the angle f1 in the FIG. 3(b) which is denoted by θ2, the center of the wire electrode in the position of the corner part in the planned dry-run path is denoted by f1", the non-short-circuited path in which the compensation value δ2 is added and the wire electrode is non-short-circuited with the workpiece in the position of angle f1 is denoted by 7, wherein the compensation value δ2 is obtained after several dry-run processes and the compensation value next to the δ2 is used for the new dry-run path in which the wire electrode short-circuits with the workpiece in the position f of the corner part, the center of the wire electrode in the position of the angle in the corner part is denoted by f1', and the contour of the machined curve path is denoted by 4'. The center f1" and f1' are located in the bisector of the angle f1. Therefore, the distance f1f1' between the point f1 of the corner part and the point f1', which is in the center of the wire electrode contacting with the short-circuited path 4' and located in the bisector of angle f1, minus the distance between point f1 and f1" is the wire flexure f1'f1" in the angle f1, thus, The wire flexure=$ff''=(\delta b 2/\sin[(360°-\theta 2)/2]=\delta 2/\sin(\delta 2/2)$

TABLE 1

Illustrates the Short - Circuited Testing

| | | Compensation Value | | | | | | | | | | The compensation value of the line flexure | The line flexure |
|---|---|---|---|---|---|---|---|---|---|---|---|---|---|
| angle | | -15 | -10 | -5 | 0 | 5 | ... | 15 | 20 | 25 | 30 | | |
| 80– | A1 | S | S | S | S | S | | S | | | | 18 | 25.5 |
| 100 | A2 | S | S | S | S | S | | S | | | | | |
| | A3 | S | S | S | S | S | | S | | | | | |
| | a4 | S | S | S | S | S | | S | S | | | | |
| 25–35 | b | S | S | S | S | S | | S | S | S | S | 30 | 115.9 |
| 50–65 | c | S | S | S | S | S | | S | S | S | | 25 | 52 |
| 100– | i | S | S | S | S | S | | | | | | 5 | 5.9 |
| 130 | d | S | S | S | S | S | | | | | | | |
| 240– | e1 | S | S | | | | | | | | | -8 | -10.1 |
| 270 | e2 | S | S | | | | | | | | | | |
| | f1 | S | S | S | | | | | | | | | |
| | f2 | S | S | S | | | | | | | | | |
| 210– | g1 | S | S | S | | | | | | | | -5 | -5.4 |
| 240 | g2 | S | S | S | | | | | | | | | |
| | h | S | S | S | | | | | | | | | |

The increased/decreased amount of compensation value used in each dry-run process of this method can be chosen to be in different values. For example, the amount in this embodiment is 5 μm but can also be 3 μm or other value.

Figure 2:
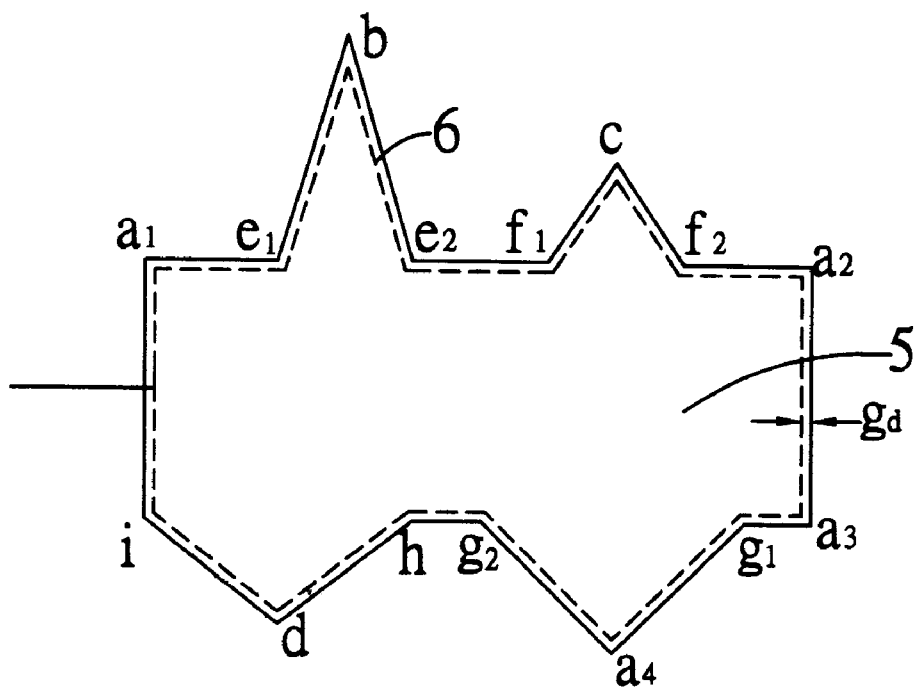
FIG. 2 is a schematic view which illustrates an embodiment of a method for measuring the wire flexure of wire-cut electric discharge machine in accordance with the present invention.

In another embodiment of this invention as shown in FIG. 2, after the unwanted wasted materials and scrap have been removed to get the space 5, the wire electrode detects margins of the workpiece 2 in a straight groove of the machined path to get the discharging gap gd which is the distance between the margin of wire electrode without contacting with the workpiece along the straight machining path and the point where the wire electrode contacts with the workpiece. As shown by the phantom line 6 in the FIG. 2, the new dry-run path is obtained by deducting the discharging gap gd from the original programmed path to trigger the detection voltage which is used for detecting the margin of the workpiece to make the wire electrode move along the new dry-run path without contacting with the workpiece, and to measure the compensation values in different corners. For angles less than 180° as shown in FIG. 3(a), while the wire electrode contacts with the short-circuited curve path 4 in the bisector of angle c which is in the value of θ1, the wire electrode is retracted relative to the short-circuited curve path 4 along the bisector line of the angle C. And when the short-circuited contact between the wire electrode and the workpiece has been just released by the forgoing retraction, the displacement C'C" is the wire flexure of the angle C in that corner part, and the wire flexure times the sine function of θ/2 is the compensation value in the angle C.

As shown in FIG. 3(b), for an angle in a corner part greater than 180°, while the wire electrode advances in the groove along the machining path to the center line position of the angle f1 in the value of φ2, the wire electrode would keep a distance from the short-circuited curve path 4', and then, the wire electrode is advanced relative to the short-circuited curve path 4' along the center line of the angle, and thereafter, when the wire electrode has come into contact with the short-circuited curve path 4', and then the short-circuited contact between the wire electrode and the short-circuited curve path 4' has been just released by the foregoing advance, the displacement f1'f1" is the wire flexure of angle f1 in that corner part. The wire flexure value times the sine function of $\theta_2/2$ of the angle f1 in the corner part is the compensation value of the angle f1 in the corner part. The compensation value of the flexure value and the flexure value in different corner parts are stored in a memory built in an numerical control device for adjusting the discharge parameters at machining.

As for the method for measuring the flexure value and the compensation value in the circular arc during the course of machining, the same method which uses the detection voltage to detect the machined groove is obtained by gradually changing the compensation value. For the inside of a circular arc shown in FIG. 4(a), if the compensation value $\delta 3$ (obtained after several dry-run process) of the flexure in the circular arc is less than or equal to the curvature radius R of the planned idle dry-run path in that circular arc, the flexure is equal to P"P' which is equal to $\rho$P" minus $\rho$P' and equal to $\delta 3$, wherein point P is in the middle point position of the circular arc corresponding to the curvature center $\rho$ of the radius of the circular arc, and point P" is the center of the wire electrode, which is located on the line that starts and extends from curvature radius $\rho$ of the circular arc to the middle point P of the corresponding circular arc, along the planned dry-run path 6. The path 7 is the non-short-circuited path while the compensation value $\delta 3$ is added and the curve path 4 is cut, and P' is the center of the wire electrode which is the intersection of the non-short-circuited path and the line starting and extending from the curvature radius of the circular arc to the middle point P of the corresponding circular arc.

Figure 4A:
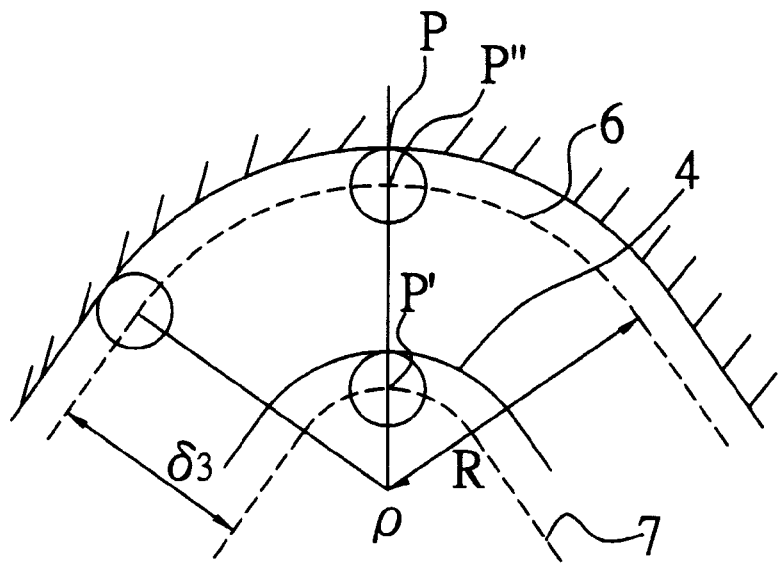
FIG. 4a is a schematic view which illustrates the compensation value of the wire flexure in positions of the inside of a circular arc being not greater than the radius of curvature in positions of the circular arc in the planned dry-run path in accordance with another embodiment of a method of the present invention for measuring the wire flexure in a circular arc of wire-cut electric discharge machine.
Figure 4B:
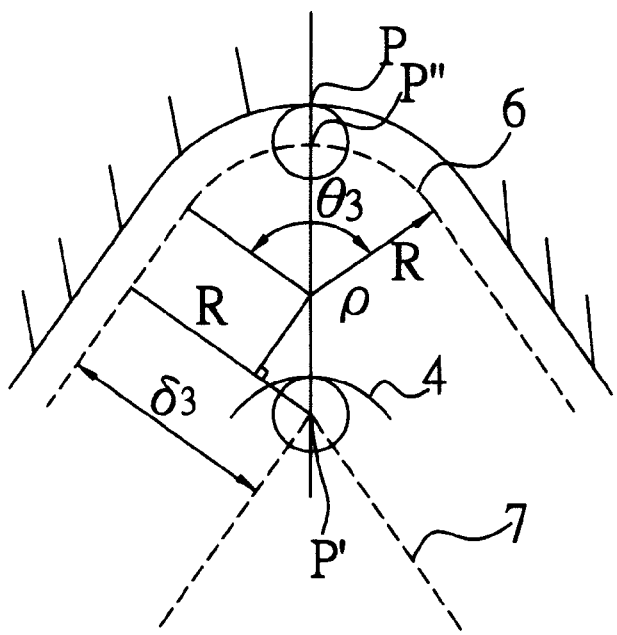
FIG. 4b is a schematic view which illustrates the compensation value of the wire flexure in positions of the inside of a circular arc greater than the radius of curvature in positions of the circular arc in the planned dry-run path in accordance with another embodiment of a method of the present invention for measuring the wire flexure in a circular arc of wire-cut electric discharge machine.

While the compensation value $\delta 3$ of the flexure is greater than the curvature radius R of the planned dry-run path in that circular arc, as shown in FIG. 4(b), the flexure is as following:

$$\text{The wire flexure} = p''p' = pp'' - pp'$$
$$= R + (\delta 3 - R)/\sin[(180° - \theta 3)/2)]$$
$$= R + (\delta 3 - R)/\cos(\theta 3/2).$$

$\theta 3$ is the central angle of the circular arc.

Figure 4C:
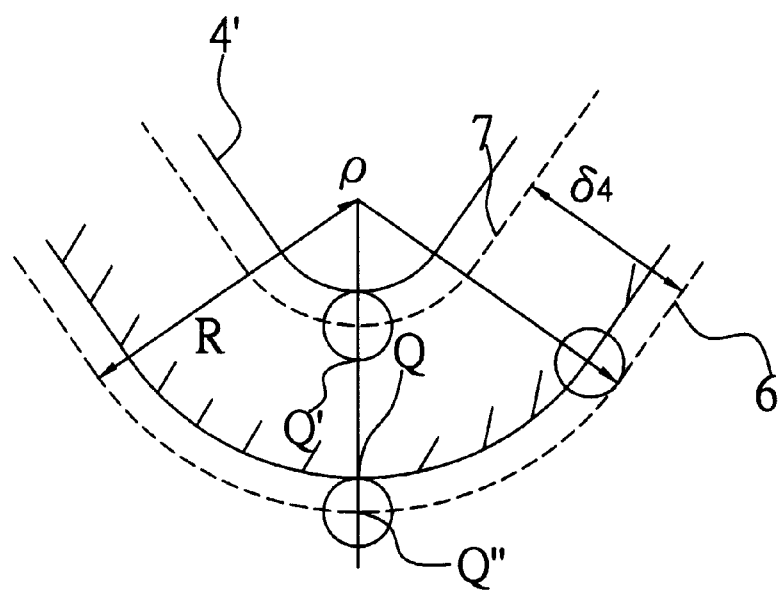
FIG. 4c is a schematic view which illustrates the compensation value of the wire flexure in positions of the outside of a circular arc being not greater than the radius of curvature in positions of the circular arc in the planned dry-run path in accordance with another embodiment of a method of the present invention for measuring the wire flexure in a circular arc of wire-cut electric discharge machine.

For the outside of circular arc shown in FIG. 4(c), if the compensation value $\delta 4$ (obtained after several dry-run process) of the flexure in the circular arc is less than or equal to the curvature radius R of the planned dry-run path in that circular arc, the flexure is equal to Q"Q' which is equal to $\rho$Q" minus $\rho$Q' and equal to $\delta 4$, wherein point Q is in the middle point position of the circular arc corresponding to the curvature center $\rho$ of the radius of the circular arc, and point Q" is the center of the wire electrode, which is located on the line starting and extending from curvature radius $\rho$ of the circular arc to the middle point Q of the corresponding circular arc, along the planned dry-run path 6. The path 7 is the non-short-circuited path while the compensation value $\delta 4$ is added and the curve path 4' is cut, and Q' is the center of the wire electrode which is the intersection of the non-short-circuited path and the line starting and extending from the curvature radius of the circular arc to the middle point Q of the corresponding circular arc.

Figure 4D:
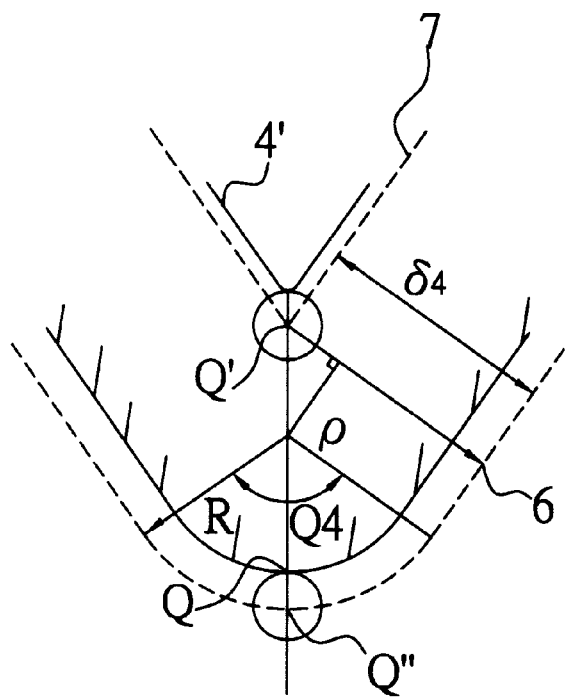
FIG. 4d is a schematic view which illustrates the compensation value of the wire flexure in positions of the outside of a circular arc greater than the radius of curvature in positions of the circular arc in the planned dry-run path in accordance with another embodiment of a method of the present invention for measuring the wire flexure in a circular arc of wire-cut electric discharge machine.

While the compensation value $\delta 4$ of the flexure is greater than the curvature radius R of the planned dry-run path in that circular arc, as shown in FIG. 4(d), the flexure is as following:

$$\text{The wire flexure} = Q''Q' = PQ'' - PQ'$$
$$= R + (\delta 4 - R)/\sin[(180° - \theta 4)/2)]$$
$$= R + (\delta 4 - R)/\cos(\theta 4/2).$$

$\theta 4$ is the central angle of the circular arc.

By using the aforesaid ways of embodiments, for the irregular circular arc in the machined groove, the proper compensation value and the wiree flexure of the irregular circular arc are obtained from dividing the irregular arc into several arcs for approximating them into several circular arcs to find out the proper compensation value and flexure, and to record them into the control device for adjusting the discharging parameters in the process of machining. The increased/decreased amount of the compensation value used in each dry-run process can also be chosen in different values.

The measurement of the wire flexure and compensation value of the circular arcs in the machined groove for the process of machining can also be accomplished by another embodiment. After the unwanted wasted materials and scrap have been removed to get the space, the wire electrode detects margins of the workpiece in a straight groove of the machined path to get the discharging gap gd which is the distance between the margin of wire electrode without contacting with the workpiece along the straight machining path and the point where the wire electrode contacts with the workpiece. The new dry-run path is obtained by deducting the discharging gap gd from the original programmed path to trigger the detection voltage which is used for detecting the margin of the workpiece to make the wire electrode move along the new dry-run path without contacting with the workpiece, and to measure the compensation values in different corners. For the inside of the circular arc shown in FIGS. 4(a) and 4(b), while the wire electrode contacts with the short-circuited curve path 4 and reaches the line starting and extending from the curvature center $\rho$ of the circular arc to the middle point P of the corresponding circular arc, the wire electrode is retracted relative to the short-circuited curve path 4 along the line which starts and extend from point $\rho$ to point P. And when the short-circuited contact between the wire electrode and the workpiece has been just released by the forgoing retraction, the displacement P'P" is the wire flexure of the circular arc. If the flexure P'P" of that circular arc is less than or equal to the curvature radius R of the planned dry-run path in that circular arc, as shown in FIG. 4(a), the flexure is as followings:

$$\text{The wire flexure} = p''p' = pp'' - pp' = \delta 3$$

The flexure is equal to the compensation value of the flexure $\delta 3$.

If the flexure P'P" of that circular arc is greater than the curvature radius R of the planned dry-run path in that circular arc, as shown in FIG. 4(b), the flexure is as followings:

$$\text{The wire flexure} = p''p' = pp'' + pp'$$
$$= R + (\delta 3 - R)/\sin[(180° - \theta 3)/2)]$$
$$= R + (\delta 3 - R)/\cos(\theta 3/2).$$

-continued $$\delta 3 = (P''P' - R)\cos(Q3/2) + R)$$
$$P''P'\cos(Q3/2) + R[1 - \cos(\theta 3/2)].$$

As shown in FIGS. 4(C) and 4(d), for positions outside the circular arcs, while the wire electrode advances in a groove along the machining path to reach the connecting line from the center ρ of the curvature of the circular arc to the middle point Q of the corresponding circular arc, the center of the wire electrode is Q" and the wire electrode is advanced relative to the short-circuited curve path 4' along the connecting line. And while the wire electrode has come into contact with the short-circuited curve path 4', and then the short-circuited contact between the wire electrode and the workpiece has been just released by the outgoing retraction, the displacement Q"Q' is the wire flexure in the circular arc. As shown in FIG. 4C, if the wire flexure Q"Q' in that circular arc is less than or equal to the radius R of curvature of that circular arc in the planned dry-run path 6, the wire flexure is equal to Q"Q'=ρQ"−ρQ'=δ4 and the compensation value δ4 of that line flexure.

If the flexure Q"Q' is greater than the radius R of curvature of that circular arc in the planned dry-run path 6, as shown in FIG. 4(d), the flexure is as followings:

$$\text{The wire flexure} = Q''Q' = PQ'' - PQ'$$
$$= R + (\delta 4 - R)/\sin[(180° - \theta 4)/2)]$$
$$= R + (\delta 4 - R)/\cos(\theta 4/2).$$

$$\delta 4 = (Q''Q' - R)\cos(Q4/2) + R$$
$$= Q''Q/\cos(Q4/2) + R[1 - \cos(\theta 4/2)].$$

The flexure value and the compensation value of the flexure value in different circular arcs are restored in a memory built in an numerical control device for adjusting the discharge parameters in the course of machining in the next time.

By using the method of the present invention, for the set up compensation value changed by the time going or other reasons, after the course of machining, the error of the flexure can be updated again to get the best machining accuracy.

From the aforesaid embodiments of the method for measuring the flexure of the wire electrode of the present invention, the technology characteristics are as followings:

Firstly, after the discharge course of machining has been finished, by using the detection voltage of the wire electrode machine to gradually change the compensation value along the machined groove to detect the short-circuit between the wire electrode and the workpiece in the corner part or the circular arc, the flexure value is obtained from the compensation value which is gradually changed to continue the groove detection until the wire electrode and the workpiece are not shot-circuited.

Secondly, after the discharge course of machining has been finished, by using the detection voltage of the wire electrode machine along the machined groove to detect the short-circuit between the wire electrode and the workpiece in the corner part or the circular arc, the compensation value in the corner part or the circular arc is obtained from the flexure value which is gradually changed to continue the groove detection until the wire electrode and the workpiece are not shot-circuited.

Thirdly, the flexure is the average value of different compensation values in positions of angles within a certain range.

Fourthly, the flexure value in different ranges is automatically restored into the controller as the machining parameter data for adjusting parameters in the next course of machining.

The method for measuring the flexure of the wire electrode of the present invention is to quickly measure the error of the flexure to establish the machining parameter data through the functions of the controller for automatically compensate the compensation value to reduce the investment of equipments for users.

The present invention has been described hitherto with exemplary preferred embodiments. However, it is to be understood that the scope of the present invention need not be limited to the disclosed preferred embodiments. On the contrary, it is intended to cover various modifications and similar arrangements within the scope defined in the following appended claims. The scope of the claims should be accorded the broadest interpretation so as to encompass all such modifications and similar arrangements.

What is claimed is:

1. A method for measuring the flexure of the wire electrode, comprising the following steps of:
    (a) making a wire electrode which is in a machining path come into contact with a detection edge of a workpiece in a straight machining groove, after machining, to get an electric discharge gap which is a distance between a margin of the wire electrode without contacting with a workpiece along the straight machining groove and a point where the wire electrode contacts with the workpiece;
    (b) using a detection voltage of a machine to detect the machined groove, and an original programmed path minus the discharge gap as a new programmed path to trigger a detection voltage for dry-run and re-machining the workpiece;
    (c) recording short-circuited positions where the wire electrode and the workpiece are short-circuited in each corner part;
    (d) changing a compensation value which is increased for an angle in the corner part less than 180°, and decreased for the angle in the corner part greater than 180° to re-machine the workpiece for the dry-run, and to detect and record that the short-circuited would happen in the corner part or not;
    (e) recording the angle in each corner part which is less than 180°, while a contact between the wire electrode and the workpiece is just released, and a present compensation value is the compensation value of the flexure value in the corner part, and recording the angle in each corner part which is greater than 180°, while the wire electrode and the workpiece are short-circuited, and a last compensation value previous to the present compensation value is used as the compensation value for the corner part to find out a flexure value of the corner part; and
    (f) recording the compensation value of the flexure value and the flexure value in each corner part in a memory built in an numerical control device for adjusting discharge parameters at machining.

2. A method as claimed in claim 1, wherein in said step (e) while the short-circuit between the wire electrode and the workpiece has been just released in the corner part, a wire flexure value is obtained from the compensation value of the flexure value divided by the sine function of one half of the angle in the corner part.

3. A method as claimed in claim 1, wherein for the angle in the corner part less than 180°, a compensation direction is in a direction of deviating from the short-circuited curve path, and for the angle in the corner part greater than 180°, a compensation direction is in a direction of approaching the short-circuited curve path.

4. A method as claimed in claim 1, wherein in said step (e) the flexure of the angle in the corner part is an average value of the flexure values of different angles in a certain range of angles.

5. A method for measuring the flexure of the wire electrode, comprising the following steps of:
   (a) making a wire electrode which is in a machining path come into contact with a detection edge of a workpiece in a straight machining groove, after machining, to get an electric discharge gap which is a distance between a margin of the wire electrode without contacting with the workpiece along the straight machining groove and a point where the wire electrode contacts with the workpiece;
   (b) using a detection voltage of a machine to detect the machined groove, and an original programmed path minus the discharge gap as a new programmed path to trigger a detection voltage for dry-run and re-machining the workpiece;
   (C) compensating different angles in different corner parts by a method which is as follows:
      for an angle in a corner part less than 180°, while the wire electrode advances in a groove along the machining path to a central line of the angle, the wire electrode would contact with the short-circuited curve path, and then, the wire electrode is retracted relative to the short-circuited path along the central line of the angle, and thereafter, when the short-circuited contact between the wire electrode and the workpiece has been just released by a foregoing retraction, a displacement is a flexure in the corner part and the flexure value times the sine function of one half of the angle in the corner part is a compensation value of the flexure in the corner part; and
      for an angle in a corner part greater than 180°, while the wire electrode advances in a groove along the machining path to a central line position of the angle, the wire electrode would keep a distance from the short-circuited curve path, and then, the wire electrode is advanced relative to the short-circuited path along the central line of the angle, and thereafter, when the wire electrode has come into contact with the short-circuited curve path, and the short-circuited contact between the wire electrode and the short-circuited curve path has been just released by the foregoing advance, the displacement is the flexure in the corner part, and the flexure value times the sine function of one half of the angle in the corner part is the compensation value of the flexure in the corner part;
   (d) recording the flexure value and the compensation value of the flexure value in different angles in a memory built in an numerical control device for adjusting discharge parameters in the course of machining in the next time.

6. A method as claimed in claim 5, wherein in said step (e) the compensation value of the flexure in the corner part is obtained by the flexure value times the sine function of one half of the angle in the corner part.

7. A method as claimed in claim 5, wherein for the angle in the corner part less than 180°, the compensation direction is in the direction of deviating from the short-circuited curve path, and for the angle in the corner part greater than 180°, the compensation direction is in the direction of approaching the short-circuited curve path.

8. A method as claimed in claim 5, wherein in said step (c) the flexure of the angle in the corner part is the average value of the flexure values of different angles in a certain range of angles.

9. A method for measuring the flexure of the wire electrode, comprising the following steps of:
   (a) making a wire electrode which is in a machining path come into contact with a detection edge of a workpiece in a straight machining groove, after machining, to get an electric discharge gap which is a distance between a margin of the wire electrode without contacting with a workpiece along the straight machining groove and a point where the wire electrode contacts with the workpiece;
   (b) using a dection voltage of a machine to detect the machined groove, and a original programmed path minus the discharge gap as a new programmed path to trigger a detection voltage for dry-run and re-machining the workpiece;
   (C) recording short-circuited positions where wire electrode and the workpiece are short-circuited in the inside of each circular arc;
   (d) changing a compensation value which is increased for an angle in the inside of each circular arc, and decreased for the angle in the outside of each circular arc to re-machine the workpiece for dry-run, and to detect and record that the short-circuited would happen in the corner part or not;
   (e) recording the angle in the inside of each circular arc, while a contact between the wire electrode and the workpiece is just released, and a present compensation value is the compensation value of the flexure value in the circular arc, and recording the angle in the outside of each circular arc, while the wire electrode and the workpiece are short-circuited, and a last compensation value previous to the present compensation value is used as the compensation value for the circular arc to find out a flexure value of the circular arc; and
   (f) recording the compensation value of the flexure value and the flexure value in each circular arc in a memory built in an numerical control device for adjusting discharge parameters at machining.

10. A method as claimed in claim 9, wherein in said step (e) while the compensation value of the flexure value in the circular arc is not greater than a radius of the curvature of planned dry-run path in the circular arc, the flexure value is equal to the compensation value of the flexure value, and while the compensation value of the flexure value in the circular arc is greater than the radius of the curvature of planned dry-run path in that circular arc, the flexure value is equal to the radius of curvature of the planned dry-run path in the circular arc plus a difference between the compensation value of the flexure value and the radius of the curvature of the dry-run path in the circular arc divided by the cosine function of one half of the central angle of the circular arc.

11. A method as claimed in claim 9, wherein for the angle in the inside of the circular arc, the compensation direction is in the direction of deviating from the short-circuited curve path, and for the angle in the outside of the circular arc, the compensation direction is in the direction of approaching the short-circuited curve path.

12. A method for measuring the flexure of the wire electrode, comprising the following steps of:
   (a) making a wire electrode which is in a machining path come into contact with a detection edge of a workpiece in a straight machining groove, after machining, to get an electric discharge gap which is a distance between a margin of the wire electrode without contacting with the workpiece along the straight machining groove and a point where the wire electrode contacts with the workpiece;

(b) using a detection voltage of a machine to detect the machined groove, and a original programmed path minus the discharge gap as a new programmed path to trigger the detection voltage for dry-run and re-machining the workpiece;

(c) compensating different angles in different circular arcs by a method which is as follows:

for positions inside the circular arcs, while the wire electrode advances in a groove along the machining path to reach a connecting line from a center of the curvature of the circular arc to a middle point of a corresponding circular arc to contact with the short-circuited curve path, the wire electrode is retracted relative to the short-circuited curve path along the connecting line, and while the short-circuited contact between the wire electrode and the workpiece has been just released by the foregoing retraction, the displacement is the flexure in the circular arc and the compensation value of the flexure in the circular arc is obtained from the flexure; and for positions outside the circular arcs, while the wire electrode advances in a groove along the machining path to reach a connecting line from a center of the curvature of the circular arc to a middle point of a corresponding circular arc, the wire electrode is advanced relative to the short-circuited curve path along the connecting line, and while the wire electrode has come into contact with the short-circuited curve path, and then the short-circuited contact between the wire electrode and the workpiece has been just released by the outgoing retraction, the displacement is the flexure in the circular arc and the compensation value of the flexure in the circular arc is obtained from the flexure; and (d) recording the compensation value of the flexure value and the flexure value in each circular arc in a memory built in an numerical control device for adjusting discharge parameters at machining.

13. A method as claimed in claim 12, wherein while the flexure value in the circular arc is not greater than the radius of the curvature of planned dry-run path in the circular arc, the flexure value is equal to the compensation value of the flexure value, and while the flexure value in the circular arc is greater than the radius of the curvature of planned dry-run path in the circular arc, the compensation value of the flexure value is equal to the flexure times the cosine function of one half of the central angle of the circular arc plus the difference between the radius of the curvature of the planned dry-run path in the circular arc and the cosine function of one half of the central angle of the center of the curvature in the circular arc.

* * * * *